Patented Feb. 17, 1931

1,793,027

UNITED STATES PATENT OFFICE

SAMUEL LEWIS SUMMERS, OF FORT WASHINGTON, PENNSYLVANIA

METHYLENE-DIGUAIACOL DERIVATIVE

No Drawing.   Application filed October 12, 1928.   Serial No. 312,204.

My invention relates to organic compounds and their manufacture and is especially concerned with novel arsenic derivatives of the di(aminobenzyl) derivatives of methylene-diguaiacol. These substances are useful for pharmaceutical purposes as hereinafter indicated.

My products may be prepared as follows, a method for carrying out each step being given without limiting myself to the exact methods given.

The first main step is to introduce two nitrobenzyl groups into methylene-diguaiacol. A satisfactory way of doing this is to heat a mixture of 256 parts of methylene-diguaiacol, 344 parts of nitrobenzyl chloride, and 90 parts sodium hydroxide or 250 parts of sodium carbonate, to 130° C. for 24 hours. Any one of the three isomeric nitrobenzyl chlorides, the ortho, meta or para, may be used with corresponding slight differences in the products. The product is washed free of inorganic salts and is then essentially a di(nitrobenzyl) derivative of methylene-diguaiacol in which the two nitrobenzyl groups enter the two guaiacol residues ortho to the hydroxyl groups:

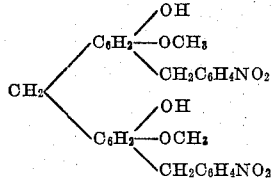

The second main step is the reduction of this to the corresponding diamino derivative. This may be done by mixing 530 parts of the above described di(nitrobenzyl) derivative with 200 parts of fused crystallized sodium sulphide and 70 parts sodium hydroxide, heating in an autoclave, for 10 hours at 150° C. The product is purified by washing with cold water. The essential product is a di(aminobenzyl) derivative of methylene-diguaiacol, a yellowish powder insoluble in water but soluble in methanol.

The third main step is the arsenation of this product. To accomplish this, I heat 468 parts of the di(aminobenzyl) derivative of methylene-diguaiacol with 302 parts of ortho-arsenic acid, in a fume closet, to 160° C. for 4 hours. The product of the reaction is purified by washing with water. The arsenated compound is insoluble in water and carbon tetrachloride, slightly soluble in glacial acetic acid, more so in ethyl alcohol, more so in methanol, and still more so in acetone. Its empirical formula is $C_{29}H_{32}O_{10}N_2As_2$. It is useful as a systemic antiseptic in the treatment of syphilis and sleeping sickness. The dose for an adult may be from 2 to 10 grains per day.

Having thus described my invention, I claim:

The herein described arsenated di(aminobenzyl) derivative of methlyene-diguaiacol, insoluble in water but soluble in methanol, alcohol, and acetone, and having the empirical formula $C_{29}H_{32}O_{10}N_2As_2$.

In testimony whereof, I have hereunto signed my name at Ambler, Pennsylvania, this 9th day of October, 1928.

SAMUEL LEWIS SUMMERS.